No. 880,171. PATENTED FEB. 25, 1908.
G. A. SMITH & H. E. STEIN.
GARDEN PLOW.
APPLICATION FILED SEPT. 19, 1907.
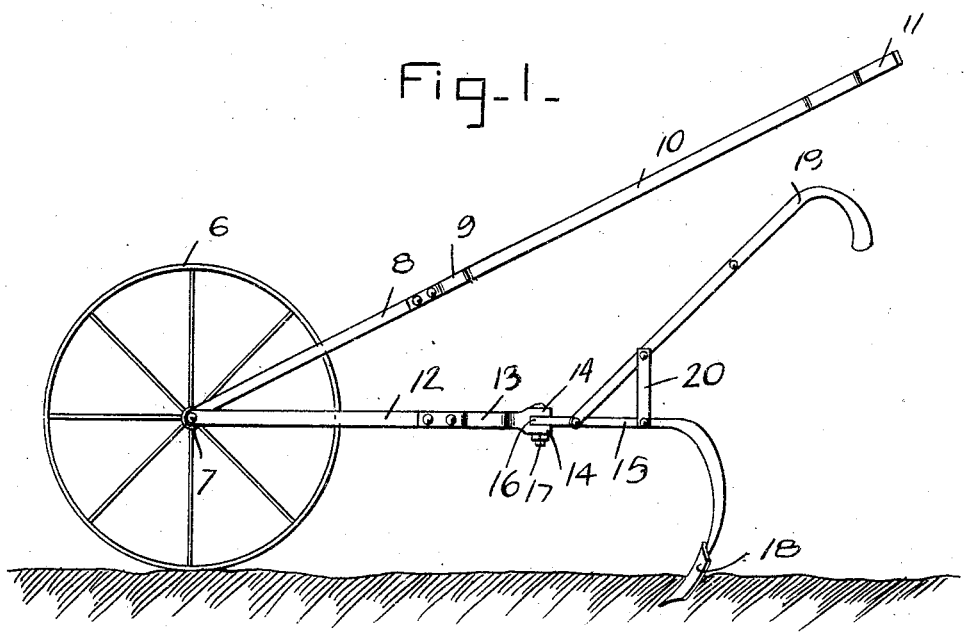
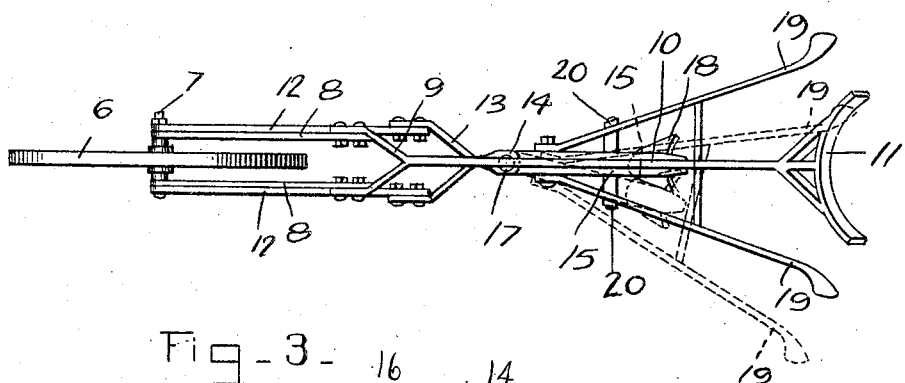
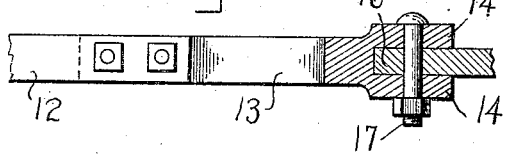

UNITED STATES PATENT OFFICE.

GEORGE A. SMITH AND HARRY E. STEIN, OF BAXTER SPRINGS, KANSAS.

GARDEN-PLOW.

No. 880,171.      Specification of Letters Patent.      Patented Feb. 25, 1908.

Application filed September 19, 1907. Serial No. 393,708.

*To all whom it may concern:*

Be it known that we, GEORGE A. SMITH and HARRY E. STEIN, citizens of the United States, residing at Baxter Springs, in the county of Cherokee, State of Kansas, have invented certain new and useful Improvements in Garden-Plows; and we do hereby declare the following to be a full, clear, and exact description of the invention, such as will enable others skilled in the art to which it appertains to make and use the same.

This invention relates to garden plows and has for its object to provide an implement of this class which will be better suited for general work than the present forms of such implements. In other words, I contemplate the provision of a plow which may be used under any and all conditions and which will perform its work effectually regardless of circumstances. Heretofore, such plows have been so constructed that they are only adaptable to a certain class of work and as a consequence, it has been customary for a farmer to provide himself with several of the plows each suited to a certain class of work.

In the accompanying drawings, Figure 1 is a side elevation of a plow embodying my invention, Fig. 2 is a top plan view thereof, showing in dotted lines the position of parts when the plow is swung to one side, Fig. 3 is a detail vertical sectional view through the hinge joint for the plow.

As shown in the drawings, the plow comprises a wheel 6 which is mounted upon an axle 7. This axle is engaged through the forward ends of a pair of bars 8 and bolted to the said bars at their rear ends are the ends of a yoke 9 which is formed at the forward end of a bar 10. This bar 10 is provided at its rear end with a body rest 11 against which the chest or body of the operator is placed when pushing the plow over the ground, the rest being of course suitably curved.

The extreme ends of the axle 7 are fixed in the forward ends of bars 12 and these bars are also secured at their rear ends to the ends of a yoke 13. The stem of this yoke is cast with ears 14 which are spaced apart and between which is received the front end of a plow beam 15, there being an ear 16 formed at the said front end of the beam and a bolt 17 engaged through the ears 14 of the yoke stem and the ear 16. A nut is engaged upon the said bolt and by tightening this nut, the plow beam may be securely held at various angles with respect to the bars 12 considered in a horizontal plane. As shown in the drawings the rear end portion of the beam 15 is bent downwardly and forwardly and a plow shovel 18 is secured to it at its lower end. From the foregoing it will be seen that the plow beam may be adjusted so that the plow shovel will dig a furrow to one side of the line of travel of the machine.

In order that the machine may be guided at the same time it is being pushed over the ground, a pair of handles 19 are provided and these handles are secured at their lower forward ends to the plow beam adjacent the hinge joint above described and are braced therefrom by means of braces 20. The bar 10 extends between the handles as is clearly shown in Fig. 2 of the drawings and at the same time the operator places his body against the body rest 11, he grasps the handle 19 and pushes and guides the implement at the same time.

What is claimed, is—

An implement of the class described comprising a pair of bars, a ground wheel journaled between the forward ends of the bars, a bar provided at its forward end with a yoke, the ends of the yoke being secured to the rear ends of the first mentioned bars, a body rest carried at the rear end of the last mentioned bar, a pair of bars connected at their forward ends outwardly of the first mentioned pair of bars, a yoke secured at its ends to the rear ends of the last mentioned pair of bars, the stem of the yoke being formed with a pair of spaced ears, a beam provided at its forward end with an ear which is received between the pair of ears upon the yoke stem, a bolt engaged through said ears and designed to hold the yoke at various angles with respect to the first mentioned pair of bars, a soil treating element carried at the lower end of the beam, and a pair of handles secured at their lower ends to the beam and extending thereabove.

In testimony whereof, we affix our signatures in presence of two witnesses.

GEORGE A. SMITH.
               HARRY E. STEIN.

Witnesses:
   L. O. GRAY,
   JOE SHERER.